United States Patent
Jungmann et al.

(10) Patent No.: US 9,835,215 B2
(45) Date of Patent: Dec. 5, 2017

(54) DISC BRAKE, IN PARTICULAR FOR COMMERCIAL VEHICLES

(71) Applicant: WABCO Europe BVBA, Brussels (BE)

(72) Inventors: Hans-Christian Jungmann, Gorxheimertal (DE); Gunther Stingl, Mühltal (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 14/911,608

(22) PCT Filed: May 23, 2014

(86) PCT No.: PCT/EP2014/001395
§ 371 (c)(1),
(2) Date: Feb. 11, 2016

(87) PCT Pub. No.: WO2015/036064
PCT Pub. Date: Mar. 19, 2015

(65) Prior Publication Data
US 2016/0186827 A1    Jun. 30, 2016

(30) Foreign Application Priority Data

Sep. 10, 2013  (DE) .................. 10 2013 015 002

(51) Int. Cl.
*F16D 55/18*   (2006.01)
*F16D 65/56*   (2006.01)
(Continued)

(52) U.S. Cl.
CPC ......... *F16D 65/567* (2013.01); *F16D 55/225* (2013.01); *F16D 65/18* (2013.01); *F16J 3/042* (2013.01); *F16J 15/52* (2013.01)

(58) Field of Classification Search
CPC .... F16D 2125/08; F16D 65/56; F16D 65/567; F16D 65/568; F16D 2125/28
See application file for complete search history.

(56) References Cited

U.S. PATENT DOCUMENTS 4,503,595 A    3/1985  Sheill
5,458,344 A *  10/1995 Weiler .................. F16D 65/18
                                              277/634
(Continued)

FOREIGN PATENT DOCUMENTS

DE        103 22 834 A1    12/2004
DE   10 2007 059 777 A1    6/2009
(Continued)

OTHER PUBLICATIONS

Machine translation of WO 2013/143978 (no date).*
(Continued)

*Primary Examiner* — Nicholas J Lane
(74) *Attorney, Agent, or Firm* — Brinks Gilson & Lione

(57) ABSTRACT

A disc brake, in particular for commercial vehicles, has an adjustment device for compensating for brake lining/brake disc wear. The adjustment device is arranged at least partially inside an interior space of the brake caliper and has an adjustment gear with an adjustment nut having an internal thread, and an adjustment spindle screwed therein with an external thread. For adjustment during normal operation of the brake, the adjustment nut is rotated in relation to the adjustment spindle, which is fixed against rotation. A first sealing device at least partially seals off an annular space on the brake disc side between the inner wall of a through-opening in the brake caliper and the axially adjustable adjustment spindle, which extends through the through-opening and toward one of the brake linings, wherein the first sealing device is held on the caliper at one end.

13 Claims, 4 Drawing Sheets

(51) Int. Cl.
  *F16D 65/18* (2006.01)
  *F16J 3/04* (2006.01)
  *F16J 15/52* (2006.01)
  *F16D 55/225* (2006.01)

(56) References Cited

U.S. PATENT DOCUMENTS

| | | | | |
|---|---|---|---|---|
| 5,819,884 | A * | 10/1998 | Giering | F16C 19/502 188/71.9 |
| 6,354,407 | B1 * | 3/2002 | Heinlein | F16D 65/18 188/106 F |
| 6,435,319 | B1 * | 8/2002 | Thomas | F16D 65/18 188/196 D |
| 6,811,158 | B2 * | 11/2004 | Heinlein | F16D 65/18 277/634 |
| 6,899,204 | B2 * | 5/2005 | Baumgartner | F16D 55/2255 188/71.9 |
| 6,923,297 | B1 * | 8/2005 | Thomas | F16D 65/00 188/196 D |
| 7,331,431 | B2 * | 2/2008 | Fischer | F16D 65/183 188/196 D |
| 8,387,761 | B2 * | 3/2013 | Siebke | F16D 65/18 188/264 G |
| 2010/0314205 | A1 * | 12/2010 | Falter | F16D 65/00 188/71.7 |
| 2012/0325595 | A1 * | 12/2012 | Malki | F16D 65/568 188/71.7 |

FOREIGN PATENT DOCUMENTS

| | | | |
|---|---|---|---|
| EP | 2 489 897 A1 | 8/2012 | |
| WO | WO 2013143978 A1 * | 10/2013 | F16J 3/042 |

OTHER PUBLICATIONS

European Patent Office, Rijswijk, Netherlands, International Search Report of International Application PCT/EP2014/001395, dated Sep. 3, 2014, 2 pages.

* cited by examiner

DISC BRAKE, IN PARTICULAR FOR COMMERCIAL VEHICLES

TECHNICAL FIELD

The invention relates to a disc brake, in particular for commercial vehicles, having a brake disc, a brake caliper, an application device arranged in the brake caliper, at least one brake lining on each side of the brake disc, an adjustment device for compensating for brake lining/brake disc wear, which is arranged at least partially inside an interior space of the brake caliper and to which an adjustment gear belongs, said adjustment gear having an adjustment nut, which has an internal thread, and an adjustment spindle, which is screwed therein and has an external thread, and being designed in such a way that, for adjustment during normal operation of the brake, the adjustment nut is rotated in relation to the adjustment spindle, which is fixed against rotation, and a first sealing device for at least partially sealing off an annular space on the brake disc side, said annular space being delimited on one side by the inner wall of a through-opening in the brake caliper and on the other side by the axially adjustable adjustment spindle, which extends through the through-opening and toward one of the brake linings, wherein the first sealing device is held on the caliper at one end.

BACKGROUND OF THE INVENTION

Brake discs of the abovementioned type are known, e.g. from DE 10 2007 059 777 A1. In general, disc brakes of the relevant type are pneumatically and/or electromechanically actuable.

The adjustment nut can be rotated for adjustment. It has a pressure collar, the end face of which that faces the brake disc generally extends into the through-opening in the brake caliper, both when the brake is unactuated and when it is actuated. The through-opening can also be formed on a closure plate which sealingly closes the brake caliper or a sheet-metal cover of the caliper, which is referred to below merely as a "cover".

The abovementioned through-opening is a functional opening for the passage of at least one pressure or adjustment spindle, which is fixed in terms of rotation but can be moved axially by means of the adjustment nut, wherein the axial movement or adjustment is used to compensate lining and/or disc wear. The adjustment spindle acts by means of one of its end sections against the brake lining on the application side.

The through-opening region in the cover for the adjustment spindle also serves as a seat for one or more seals. It is delimited by an encircling tubular collar which extends axially with respect to the interior of the brake and is adjoined by an inward-angled, radially aligned flange.

In the case of the brake according to DE 10 2007 059 777 A1, there are three differently arranged, shaped and acting (partial) seals for sealing the interior space of the caliper.

The first seal for sealing the annular space mentioned is formed by a flexible protective cap in the form of a folding boot, which is attached to the cover at one end and to a part of the adjustment spindle which faces the brake disc at the other end.

The second seal for sealing the annular space mentioned rests against the external thread of the adjustment spindle. It is held by a metal sleeve secured on the rotatable pressure collar of the adjustment nut. The metal sleeve extends radially inward to a point close to the external thread of the adjustment spindle in order to support the seal of flat design and stabilize it against twisting.

The third seal is secured on the cover and rests sealingly against the metal sleeve, thereby sealing the remainder of the annular space.

The third seal is thus situated in the radially outer part of the annular space, while the second seal is situated in the radially inner part.

Since the second seal and the metal ring are rotated for adjustment, whereas the adjustment spindle and the third seal are held fixed in terms of rotation, considerable friction forces occur during adjustment, namely between the second seal and the adjustment spindle, on the one hand, and the third seal and the metal sleeve, on the other hand. Since, furthermore, the second seal is rotated during adjustment, whereas the third seal is stationary during adjustment, the two seals cannot be combined in a single seal.

SUMMARY

It is an underlying object of the invention to develop the disc brake of the type stated at the outset in such a way that, on the one hand, smooth adjustment is ensured and, on the other hand, a simple overall construction is achieved.

According to the invention, the stated object is achieved by the fact that the first sealing device is held on the caliper at one end and bears in a sliding manner against the adjustment spindle at the other end.

By virtue of the fact that, according to the invention, the first sealing device is held on or bears in a sliding manner against both the caliper and the adjustment spindle, the latter being held in a manner fixed against rotation, it does not have any parts which can be twisted relative to the caliper or the adjustment spindle during adjustment. On the contrary, it is moved exclusively axially relative to the adjustment spindle, for which reason friction occurs only where an external thread of the adjustment spindle intersects the radially inner surface of the first sealing device. The total friction force which occurs is therefore lower than in the prior art. Moreover, it is not necessary to divide the first sealing device into a rotating part and a stationary part, and therefore the overall arrangement is simpler.

A preferred option according to the invention is a device for radially preloading the first sealing device against the adjustment spindle and/or for axially preloading the first sealing device against the adjustment nut.

Here, the axial preloading serves to ensure the sealing effect. The axial preloading can be used to press the first sealing device against the end face of a pressure collar of the adjustment nut. Skewing of this region of the seal and a resulting escape from the thread region are thereby avoided. Such phenomena can occur particularly when the pressure spindle is returned/fed in manually during a brake lining change.

As another preferred option according to the invention, it is envisaged that the first sealing device has a bulge which produces a radial preload against the adjustment spindle and/or an axial preload against the adjustment nut.

Fundamentally, this makes it possible for the first sealing device to have a very largely constant thickness. As a diaphragm-type component produced from an elastomer, it is simpler than, for example, a folding boot with differentiated material cross sections, in particular thickenings of sealing beads etc. This is because the radial or axial preload mentioned can be produced by the bulge, even when the thickness is very largely constant.

According to one aspect of the invention, the bulge is preferably trough-shaped in cross section. In particular, it has a trapezoidal cross section.

According to another aspect of the invention, the bulge is preferably situated in the radially outer region of the first sealing device, i.e. adjacent to the region of mounting in the brake caliper or in the cover or closure plate thereof. It is thereby possible to build up the supporting forces required for the radial/axial preloading. The bearing region furthermore serves to reinforce the first sealing device.

As compared with folding boots having a sealing bead, for example, this preferred solution according to the invention is a variant of the seal which is of spatially flat construction and takes account of the restricted axial installation conditions.

According to another preferred embodiment of the invention, the bulge is situated on the side of the first sealing device which faces the brake disc.

Another preferred option according to the invention is to make provision for the first sealing device to have a projection on the side facing away from the brake disc for the purpose of resting on an end of the adjustment nut which faces the brake disc. This serves to further reduce the frictional area, in view of the fact that the seal is stationary during adjustment, whereas the adjustment nut is turned.

To further reduce the frictional area, provision is furthermore made, according to the invention, for the projection to have a V-shaped cross section. As another preferred option, it is of continuous annular design.

The projection for reducing the frictional area or contact region not only brings about a reduction in the friction forces which occur but also ensures a certain spacing between the components, thereby minimizing the risk of twisting or squashing of the seal in the thread region when the adjustment nut is turned relative to the first sealing device on the adjustment spindle during adjustment or during renewal of the lining.

As another preferred option according to the invention, the first sealing device has a bead for axial position retention on the brake caliper. This ensures that the first sealing device is not taken along axially by the adjustment spindle during axial movement of the adjustment spindle.

According to another preferred embodiment of the invention, a second sealing device is used for further sealing of said annular space, said sealing device being attached to the brake caliper at one end and to the adjustment spindle at the other end. In this context, the term "attached" is taken to mean fastening which fixes the second sealing device on the adjustment spindle, particularly in the axial direction.

The second sealing device is preferably a folding boot.

BRIEF DESCRIPTION OF THE DRAWINGS

The invention is explained in greater detail below together with further details by means of a preferred embodiment with reference to the attached drawing, in which.

DETAILED DESCRIPTION OF THE DRAWINGS

Figure 1:
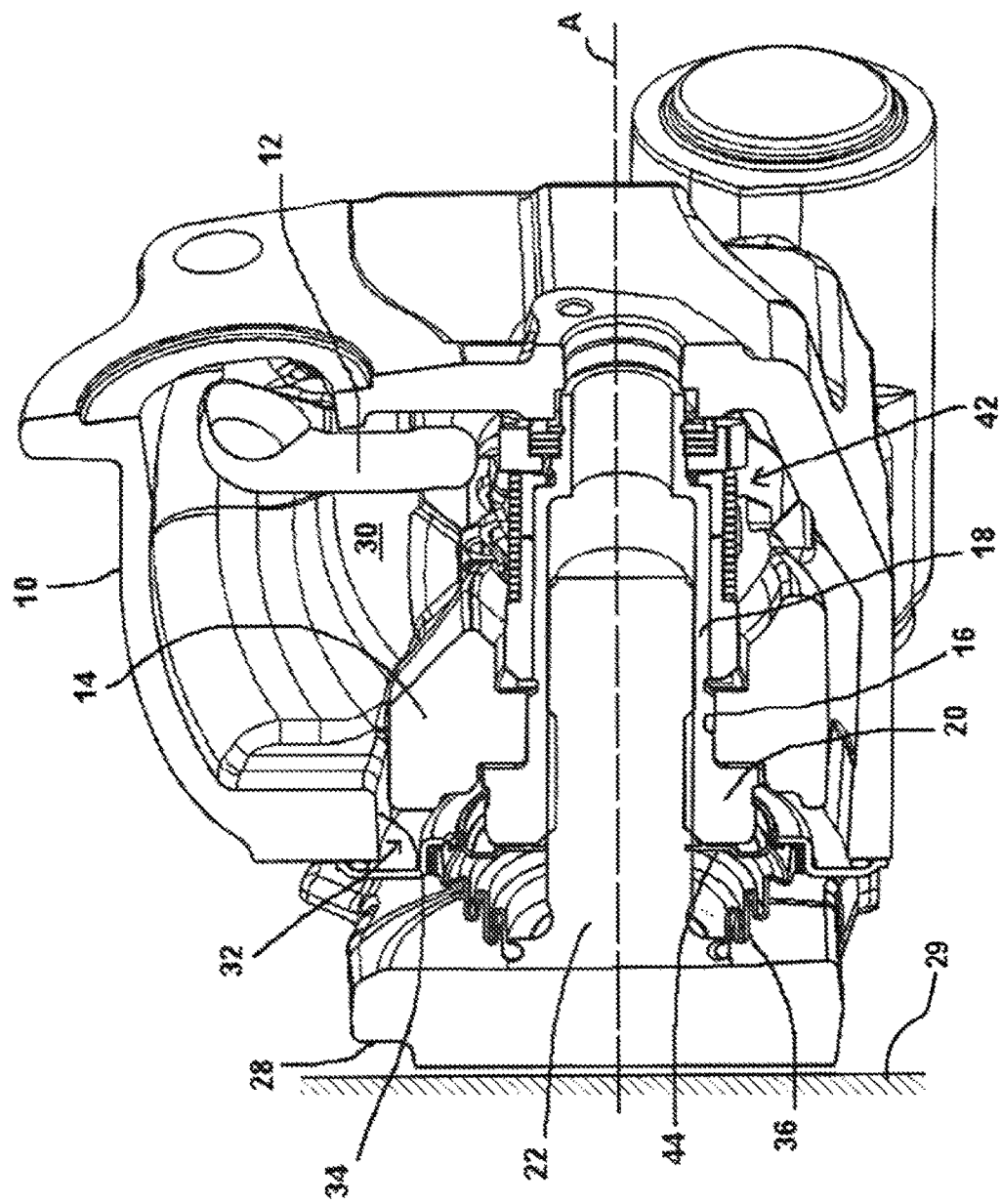
FIG. 1 shows a schematic perspective section through one embodiment of the disc brake according to the invention.

The brake shown in the drawing is a commercial vehicle disc brake having a brake caliper 10, which comprises a brake disc 29 (schematically indicated) and on which an application shaft (not shown) that can be actuated by means of a pivotable pivoted lever 12 and is transverse to an axis of rotation of the brake disc is supported. The application shaft acts on a pressure piece 14, which is mounted in a manner fixed against rotation in the brake caliper 10 and extends transversely to the brake disc. The pressure piece 14 has a through-opening 16, in which a rotatable adjustment nut 18 belonging to an adjustment device and having a pressure collar 20 facing the brake disc 29 and an axis of rotation A is accommodated. An adjustment spindle 22 with an external thread 24, which is not rotatable about the axis of rotation A, is screwed into the adjustment nut 18. For this purpose, the adjustment nut 18 is provided with an internal thread 26. The adjustment nut 18 is also referred to as a pressure sleeve. Another name for the adjustment spindle 22 is pressure spindle.

Figure 2:
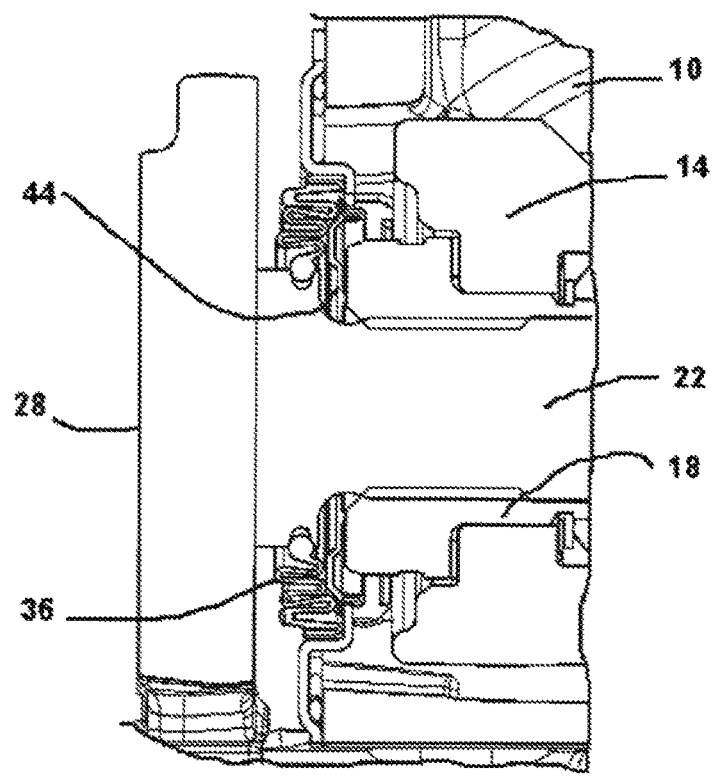
FIG. 2 shows a partially sectioned schematic detail view of the disc brake according to FIG. 1 in the initial position of the adjustment spindle.
Figure 3:
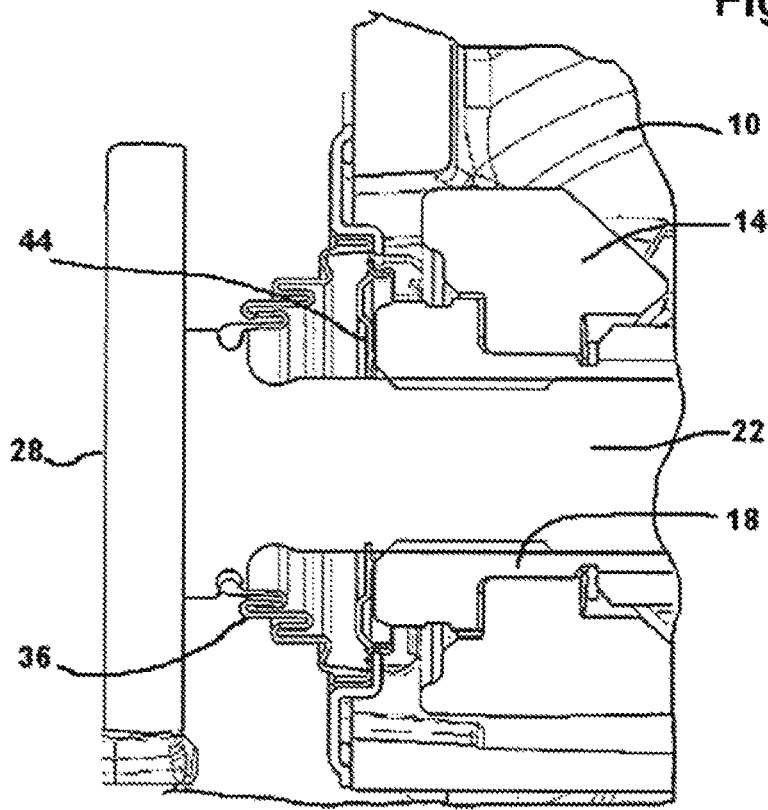
FIG. 3 shows the same view as FIG. 2 but with the adjustment spindle partially unscrewed.
Figure 4:
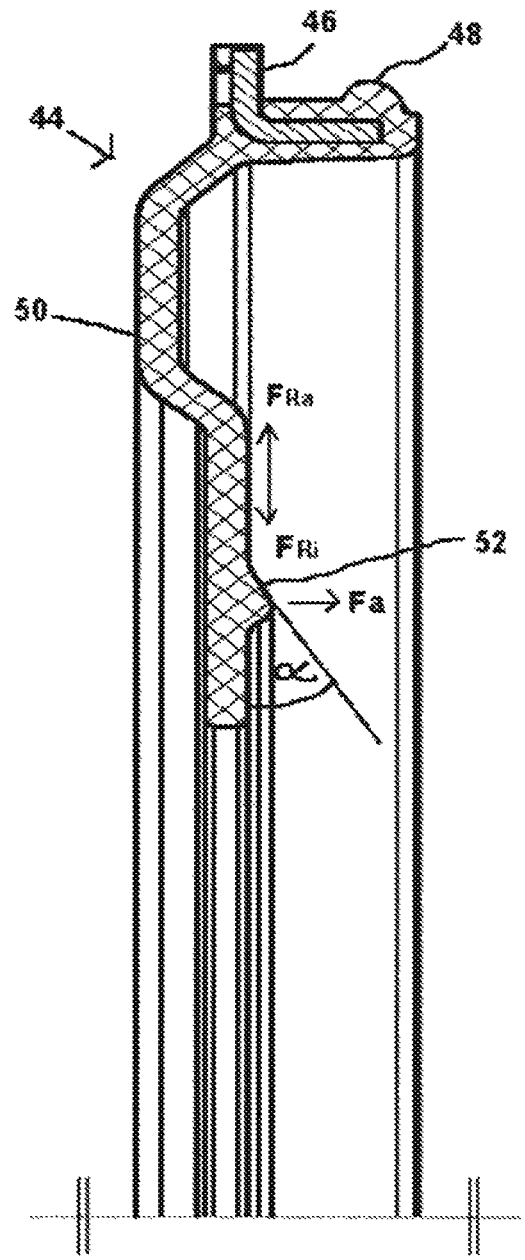
FIG. 4 shows a half section through the first sealing device of the disc brake according to FIG. 1.

When the brake is actuated, the adjustment spindle 22 presses against a brake lining 28 on the application side. The rim-side brake lining is not shown. The application lever 12, the application shaft, the pressure piece 14, the adjustment nut 18 and the adjustment spindle 22 are accommodated at least partially in an interior space 30 of the brake caliper 10. Facing the brake disc 29, the brake caliper 10 has a functional opening 32 designed as a through-opening, into or through which the pressure collar 20 of the adjustment nut 18 and the adjustment spindle 22 extend. In this arrangement, there is an annular space between the inner wall 34 of the through-opening 32 in the caliper 10 and the pressure collar 20 and adjustment spindle 22. To seal this annular space, use is made of a flexible protective cap in the form of a folding boot 36. At one end, it is attached to the brake caliper 10 or—as shown in FIGS. 1 to 3—to a tubular collar 38 on a cover 40 secured on the brake caliper 10 and, at the other end, it is attached to a part of the adjustment spindle 22 which is adjacent to the brake disc 29. The pressure piece 14 is supported on the application side of the pressure collar 20. Seated on the end of the adjustment nut 18 is an automatic adjustment device 42 which, for its part, is coupled for activation to the pivoted lever 12 in such a way that the pivoted lever 12 imparts rotation to the adjustment device 42 when required and in order to set a release clearance.

The end face of that region of the pressure collar 20 of the adjustment nut 18 which extends into the functional opening 32 serves as a contact/bearing region for the secondary/redundant seal situated in front of it, which is of the diaphragm type, seals the interior space 30 of the caliper and represents a preferred embodiment of a first sealing device. This seal is denoted by the reference number 44.

The seal 44 is composed of a flexible material (elastomer). It is designed in such a way that, in the installed state, it seals the functional opening 32 over the entire area and on both sides in the form of a ring. For this purpose, a supporting ring 46 embedded in the material of the seal is provided on the side facing the brake lining 28, said supporting ring being L-shaped in cross section and composed of metal in the embodiment shown. It has a protective and stabilizing function. Moreover, it also allows simplifications to be made in installation and, in particular, allows automated installation. An annular bead 48, which projects radially outward beyond the functional opening 32, is formed on the seal 44 on the side facing the interior space 30. The seal 44 is thus held reliably and in a fixed location on a radially inward-extending flange 49 of the cover 40.

Figure 5:
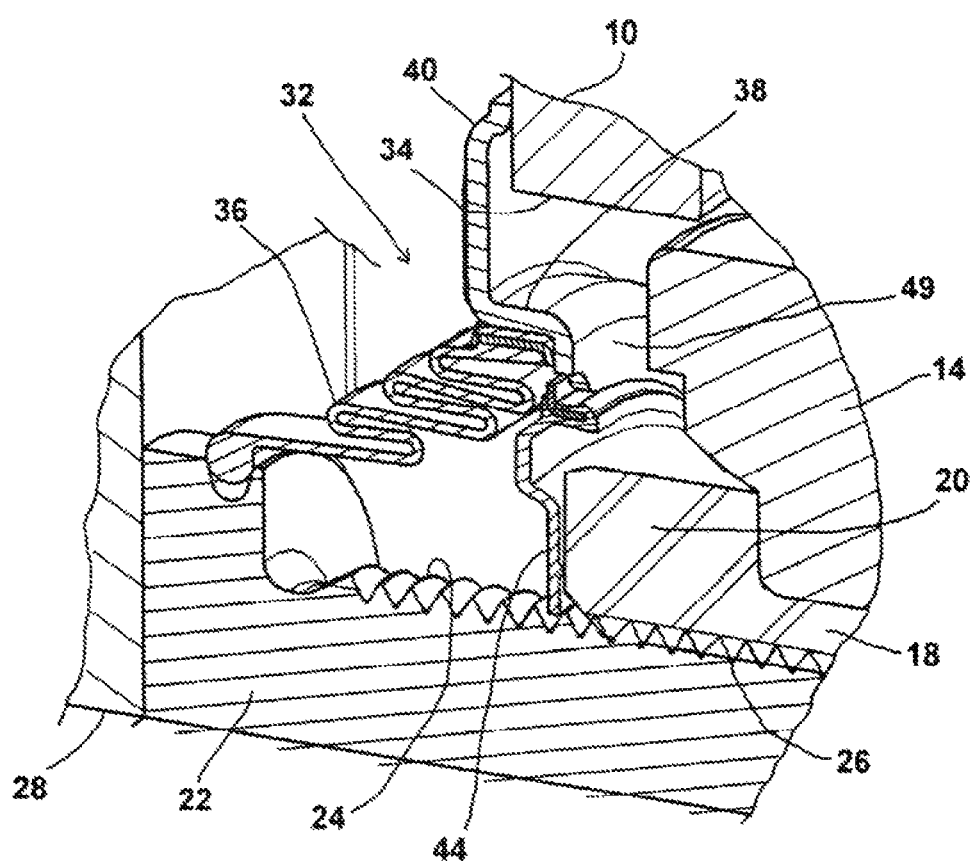
FIG. 5 shows an enlarged schematic section through the disc brake according to FIG. 1.

As can be seen particularly from FIG. 5, the seal 44 extends flexibly directly in front of the end face of the pressure collar 20 and into the region of the external thread 24 of the adjustment spindle 22. Here, the inside diameter of the seal 44 is slightly smaller than the outside diameter of the external thread 24. The wall thickness of the seal 44 is very largely constant. A bulge 50 of trough-shaped cross section extends radially inward, adjacent to the radially outer region in which said seal is fastened to the supporting ring 46. The terms "protuberance" or "outward-projecting shape" can also be used. It can be trapezoidal. The bottom thereof faces in the direction of the brake disc 29. Since the bulge 50 is situated in immediate proximity to the fixed bearing region having the supporting ring 46, said bearing region building up supporting forces, it serves not only to provide reinforcement against twisting during movements relative to the external thread but also makes it possible to build up or accept radially inward- or outward-acting elastic shear/restoring forces $F_{Ra}/F_{Ri}$. The side walls extend at an angle α to the radial plane which is about 45° in the embodiment shown. Inter alia, this also allows a configuration of the seal 44 which is shallow and thus takes up little axial installation space, does not need further additional supporting parts and nevertheless seals the external thread 24 of the adjustment spindle 22 in an effective manner.

This seal is established by virtue of the fact that the seal 44 comes to rest on the thread flanks upon initial contact with the external thread 24. Optimum thread sealing is thereby achieved, even in a radial position, this being very effective especially in the case of multi-flight threads.

The simple construction of the seal 44 is advantageous especially with a view to automated assembly operations and service work during which the seal 44 has to be replaced. There is no need to remove any holding parts because there is free access.

The bulge 50 furthermore serves to build up an axial preloading force $F_a$ toward the end face of the pressure collar 20, thus ensuring that tight/flat sealing contact is achieved. In order to avoid large-area contact involving adhesion, which may then lead to possible loss of contact in the thread region when the adjustment nut 18 is rotated, the seal 44 has an annular projection 52, which reduces the contact area. This applies especially in respect of the fact that the projection 52 is of V-shaped cross section.

The brake shown in the drawing is actuated by pivoting movements of the pivoted lever 12 when a braking operation is initiated by means of an actuating device, e.g. a brake cylinder, flanged to the end of the brake caliper 10 on the right in FIG. 1, for example. In a process involving the pressure piece 14, in which at least one adjustment nut/adjustment spindle arrangement is supported, there is a movement in the direction of the brake lining 28. Upon release of the brake, a (compression) spring system (not shown) pushes the entire application device back into the initial position. In the case of pure axial movements, the seal 44 thus follows these movements while remaining in contact with the external thread 24, wherein movements relative to the adjustment spindle 22 are enabled or compensated by the trough-shaped bulge. If adjusting movements take place during this process, there is rotation of the adjustment nut 18, and the adjustment spindle 22 is screwed out of the adjustment nut 18. However, since the seal 44 is held in a fixed location on the cover flange 34 and hence indirectly on the brake caliper 10, it remains unchanged in its axial position even if the adjustment spindle 22 is screwed out of the adjustment nut 18. It slides over the radial outer surface of the thread 24.

Even if the folding boot 36 is damaged, the interior space 30 of the brake caliper 10 and, in particular, the spindle mechanism 18/22 are protected in an effective manner by the seal 44. During a subsequent service, the folding boot 36 can be exchanged in a conventional manner. This applies also, when required, to the seal 44 since it must merely be pulled axially off the flange 49 and then removed from the adjustment spindle 22.

In the embodiment shown in the drawing, the cover 40 is screwed to the brake caliper 10, even if this is not shown specifically in the drawing.

The disc brake shown in the drawing is a single-spindle brake having a pressure piece. However, the invention can also be applied to two- or multi-spindle brakes with or without a pressure piece.

The features of the invention which are disclosed in the above description, the claims and the drawing may be significant either individually or in any combination to the implementation of the invention in its various embodiments.

While the above description constitutes the preferred embodiments of the present invention, it will be appreciated that the invention is susceptible to modification, variation and change without departing from the proper scope and fair meaning of the accompanying claims.

The invention claimed is:

1. A disc brake for commercial vehicles, comprising:
   a brake disc (29),
   a brake caliper (10),
   an application device (12) arranged in the brake caliper,
   at least one brake lining (28) on each side of the brake disc,
   an adjustment device for compensating for brake lining/brake disc wear arranged at least partially inside an interior space of the brake caliper and including an adjustment gear having an adjustment nut (18), which has an internal thread (26), and an adjustment spindle (22) screwed therein with an external thread (24), the adjustment nut (18) being rotatable during normal operation of the brake in relation to the adjustment spindle (22), which is fixed against rotation, and
   a first sealing device (44) consisting of elastomeric material with an embedded supporting ring (46) for at least partially sealing off an annular space on the brake disc side, said annular space being delimited on one side by the inner wall (34) of a through-opening (32) in the brake caliper (10) and on the other side by the axially adjustable adjustment spindle (22), which extends through the through-opening and toward one of the brake linings (28),
   wherein the first sealing device (44) is held on the caliper (10) at one of two ends of the first sealing device (44),
   wherein the first sealing device (44) bears in a sliding manner against the adjustment spindle (22) at the other one of the two ends of the first sealing device (44),
   wherein the first sealing device (44) has a projection (52) on the side facing away from the brake disc, the projection being in preloaded contact with an end of the adjustment nut (18) which faces the brake disc.

2. The disc brake as claimed in claim 1, further comprising a device (50) for preloading the first sealing device (44)

in at least one of the following two ways: radially against the adjustment spindle (22) or for axially against the adjustment nut (18).

3. The disc brake as claimed in claim 2, wherein the first sealing device (44) has a bulge (50) which forms the device for preloading the first sealing device (44).

4. The disc brake as claimed in claim 3, wherein the bulge (50) is trough-shaped in cross section.

5. The disc brake as claimed in claim 3, wherein the bulge (50) is situated in the radially outer region of the first sealing device (44).

6. The disc brake as claimed in claim 3, wherein the bulge (50) is situated on the first sealing device (44) on a side facing the brake disc.

7. The disc brake as claimed in claim 1, wherein the projection (52) has a V-shaped cross section.

8. The disc brake as claimed in claim 1, wherein the first sealing device (44) has a bead (48) for axial position retention on the brake caliper (10).

9. The disc brake as claimed in claim 1, further comprising a second sealing device (36) for sealing the annular space, the second sealing device being attached to the brake caliper (10) at one of two ends of the second sealing device (36) and to the adjustment spindle (22) at the other one of the two ends of the second sealing device (36).

10. The disc brake as claimed in claim 9, wherein the second sealing device (36) is a folding boot.

11. The disc brake as claimed in claim 9, wherein the second sealing device (36) is held on the caliper (10) by being fixed to a tubular collar (38) on a cover (40) secured on the caliper.

12. The disc brake as claimed in claim 1, wherein the first sealing device (44) bears in a sliding manner against the external thread (24) of the adjustment spindle (22).

13. The disc brake as claimed in claim 1, wherein the first sealing device (44) is held on the caliper (10) by being fixed to an inward flange (49) on a cover (40) secured on the caliper.

* * * * *